United States Patent
Curry et al.

(10) Patent No.: US 6,983,076 B2
(45) Date of Patent: Jan. 3, 2006

(54) CONTROL SYSTEM FOR DIGITAL DE-SCREENING OF DOCUMENTS

(75) Inventors: Donald J. Curry, Menlo Park, CA (US); Doron Kletter, San Mateo, CA (US); Asghar Nafarieh, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 650 days.

(21) Appl. No.: 10/188,026

(22) Filed: Jul. 1, 2002

(65) Prior Publication Data

US 2004/0001642 A1   Jan. 1, 2004

(51) Int. Cl.
G06K 9/40 (2006.01)
H04N 1/405 (2006.01)

(52) U.S. Cl. .................................. 382/260; 358/3.08
(58) Field of Classification Search ............... 382/173, 382/260, 263–264, 274–275, 266, 284, 300; 358/3.08; 345/582, 617
See application file for complete search history.

(56) References Cited

U.S. PATENT DOCUMENTS

| 4,849,914 | A |   | 7/1989 | Medioni et al. |
| 5,239,390 | A | * | 8/1993 | Tai ......................... 358/3.26 |
| 5,363,209 | A | * | 11/1994 | Eschbach et al. ........... 358/445 |
| 5,515,452 | A |   | 5/1996 | Penkethman et al. |
| 5,583,659 | A |   | 12/1996 | Lee et al. |
| 5,745,596 | A |   | 4/1998 | Jefferson |
| 5,900,953 | A |   | 5/1999 | Bottou et al. |
| 6,058,214 | A |   | 5/2000 | Bottou et al. |
| 6,324,305 | B1 |   | 11/2001 | Holladay et al. |
| 6,343,154 | B1 |   | 1/2002 | Bottou et al. |
| 6,400,844 | B1 |   | 6/2002 | Fan et al. |
| 6,633,670 | B1 |   | 10/2003 | Matthews |
| 6,839,152 | B2 | * | 1/2005 | Fan et al. ................... 358/3.08 |
| 6,850,651 | B2 | * | 2/2005 | Zaklika et al. .............. 382/275 |

FOREIGN PATENT DOCUMENTS

EP   0 712 094 A2   5/1996
EP   1 006 716 A2   6/2000

OTHER PUBLICATIONS

U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.

(Continued)

Primary Examiner—Kanjibhai Patel
(74) Attorney, Agent, or Firm—Oliff & Berridge, PLC

(57) ABSTRACT

A method and a system for controlling de-screening of documents. The control system is included in a de-screening system including a bank of filters. The filter bank receives an image signal and produces a set of filter output signals. The control system comprises a contrast module, a halftone estimate module and a pixel control module. The contrast module receives a filter output signal from a filter having a large filter span and produces a contrast signal. The halftone estimate module receives the image signal and a filter output signal from a filter having a small filter span and produces an estimated frequency signal and a halftone weight signal. Based on the contrast signal, the estimated frequency signal and the halftone weight signal, the pixel control module produces a control signal which includes information regarding which of the filter output signals are to be blended and the proportion of blending.

23 Claims, 7 Drawing Sheets

OTHER PUBLICATIONS

U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Curry et al.
U.S. Appl. No. 10/776,508, filed Feb. 12, 2004, Curry et al.
U.S. Appl. No. 10/776,516, filed Feb. 12, 2004, Curry et al.
U.S. Appl. No. 10/776,612, filed Feb. 12, 2004, Curry et al.
U.S. Appl. No. 10/187,499, filed Jul. 2002, Donald J. Curry et al.
U.S. Appl. No. 10/188,157, filed Jul. 2002, Donald J. Curry et al.
U.S. Appl. No. 10/188,249, filed Jul. 2002, Donald J. Curry et al.
U.S. Appl. No. 10/188,277, filed Jul. 2002, Donald J. Curry et al.
U.S. Appl. No. 10/612,057, filed Jul. 2003, Donald J. Curry et al.
U.S. Appl. No. 10/612,062, filed Jul. 2003, Donald J. Curry et al.
U.S. Appl. No. 10/612,063, filed Jul. 2003, Donald J. Curry et al.
U.S. Appl. No. 10/612,064, filed Jul. 2003, Donald J. Curry et al.
U.S. Appl. No. 10/612,084, filed Jul. 2003, Donald J. Curry et al.
U.S. Appl. No. 10/612,234, filed Jul. 2003, Donald J. Curry et al.
U.S. Appl. No. 10/612,246, filed Jul. 2003, Donald J. Curry et al.
U.S. Appl. No. 10/612,248, filed Jul. 2003, Donald J. Curry et al.
U.S. Appl. No. 10/612,250, filed Jul. 2003, Donald J. Curry et al.
U.S. Appl. No. 10/612,368, filed Jul. 2003, Donald J. Curry et al.
U.S. Appl. No. 10/612,461, filed Jul. 2003, Donald J. Curry et al.
U.S. Appl. No. 10/612,261, filed Jul. 2003, Donald J. Curry et al.
R. De Queiroz, "Compression of Compound Documents," *IEEE*, 1999.
Pending Application, filed Jun. 28, 2002, Donald J. Curry, et al, U.S. Appl. No. 10/187,499.
Pending Application, filed Jun. 28, 2002, Donald J. Curry, et al, U.S. Appl. No. 10/188,249.
Pending Application, filed Jun. 28, 2002, Donald J. Curry, et al, U.S. Appl. No. 10/188,277.
Pending Application, filed Jun. 28, 2002, Donald J. Curry, et al.

* cited by examiner

F_3

F_11

F_5

F_7

CONTROL SYSTEM FOR DIGITAL DE-SCREENING OF DOCUMENTS

CROSS-REFERENCE TO RELATED APPLICATIONS

Ser. No. 10/187,499 entitled "Digital De-screening of Documents", Ser. No. 10/188,249 entitled "Segmentation Method and System for Multiple raster Content (MRC) Representation of Documents", Ser. No. 10/188,277 and now U.S. Pat. No. 6,859,204 entitled "Dynamic Threshold System for Multiple Raster Content (MRC) Representation of Documents", Ser. No. 10/188,157 entitled "Separation System for Multiple Raster Content (MRC) Representation of Documents," all filed Jul. 1, 2002, on the same date as the present application and commonly assigned to the present assignee, the contents of which are herein incorporated by reference.

BACKGROUND OF THE INVENTION

1. Field of the Invention

The present invention relates generally to methods and systems for image processing, and more particularly to methods and systems for de-screening digitally scanned documents.

2. Description of Related Art

Almost all printed matter, except silver-halide photography, is printed using halftone screens. These halftone screens are traditionally optimized for the printing device, and may cause considerable halftone interference (visible large-area beating) and visible Moire patterns if not properly removed from the original scanned image. The successful removal of such screens without compromising text and line art quality is a fundamental key to quality document scanning and document segmentation and compression.

SUMMARY OF THE INVENTION

A method and a system for controlling de-screening of documents are disclosed. The control system is included in a de-screening system including a bank of filters. The filter bank receives an image signal and produces a set of filter output signals. The control system comprises a contrast module, a halftone estimate module and a pixel control module. The contrast module receives a filter output signal from a filter having a large filter span and produces a contrast signal. The halftone estimate module receives the image signal and a filter output signal from a filter having a small filter span and produces an estimated frequency signal and a halftone weight signal. Based on the contrast signal, the estimated frequency signal and the halftone weight signal, the pixel control module produces a control signal which includes information regarding which of the filter output signals are to be blended and the proportion of blending.

BRIEF DESCRIPTION OF THE DRAWINGS

The features and advantages of the present invention will become apparent from the following detailed description of the present invention in which.

DETAILED DESCRIPTION OF THE INVENTION

In this invention, a new method and system are described for de-screening digitally scanned documents such that potential halftone interference and objectionable Moire patterns are eliminated or substantially reduced. The method employs a filter bank to filter out different halftone screen frequencies. In one embodiment, the filters of the filter bank are two-dimensional filters having separable pyramid-shaped responses for easy and efficient implementation in hardware. The outputs of the filter bank are dynamically blended together, on a pixel-by-pixel basis, to produce the de-screened output. In one embodiment, the method utilizes two color contrast windows at different resolutions as well as frequency and halftone weight measures to carefully filter out the screen but preserve text and line art edges. The method also has the capability to enhance text and line art by sharpening the edges and detect neutral (i.e., no-color) pixels.

It is important to note that, in the method of the present invention, the blurring (lowpass filtering) and sharpening are independently controlled. The sharpening is performed after the blurring.

The method of the present invention can be made fully programmable through the use of piecewise linear control functions and various threshold registers. The de-screening cutoff frequencies, degree of halftone screen removal, and choice of the amount of edge enhancement can all be adjusted and tuned for high-quality output. The present invention is applicable to any document-scanning product.

One embodiment of the present invention was implemented in software and demonstrated to deliver excellent image quality across a wide range of screen frequencies and typography sizes.

Figure 1:
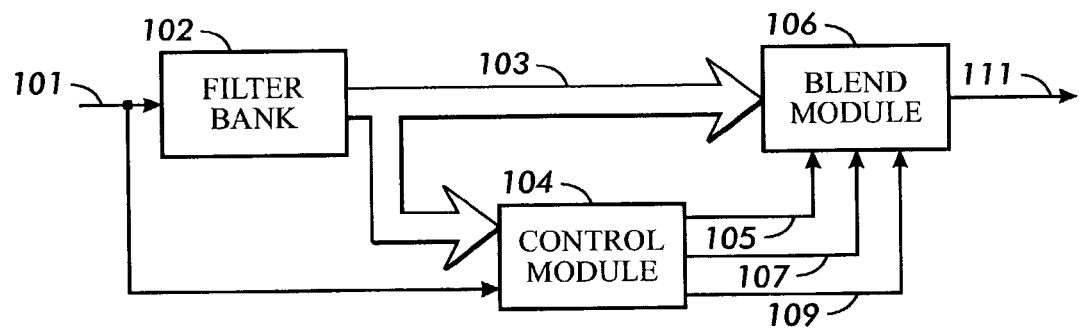
FIG. 1 is a block diagram of the system of the present invention.

FIG. 1 is a block diagram of the system of the present invention. System 100 comprises a filter bank 102, a control module 104 and a blend module 106.

The filter bank 102 receives the input signal 101 and produces a set of filter output signals 103 which are filtered versions of the input signal, each having an increasingly larger filter span. In one embodiment, for a given input resolution, the size of the largest filter is chosen to be approximately directly proportional to the inverse of the lowest frequency to be de-screened, and the size of the smallest filter is chosen to be approximately directly proportional to the inverse of the highest frequency to be de-screened.

The control module 104 receives the input signal 101 and some of the filter output signals, and produces control signal 105. The control signal 105 indicates, on a pixel-by-pixel basis, which filtered output signals are to be blended together and the blending proportion. In one embodiment, the control module 104 also generates additional control signals 107, 109 which provide enhancement control in terms of the pixel neutrality and edge sharpness, respectively.

The blend module 106 receives the filter output signals 103 from the filter bank 101 and the control signals 105, 107, 109 from the control module 104. The blend module 106 selects and blends filter output signals in accordance with the control signal 105. Optionally, the blend module 106 can also apply edge-sharpening and/or neutral treatment to the blended signal in accordance with the control signals 107, 109. The blend module 106 outputs the de-screened signal 111.

The control module 104 does not have to receive the signals from the filter bank 102 at the same time as they are provided to the blend module 106. In one embodiment, the signals from the filter bank 102 are provided to the control module 104 when they are needed.

Figure 2:
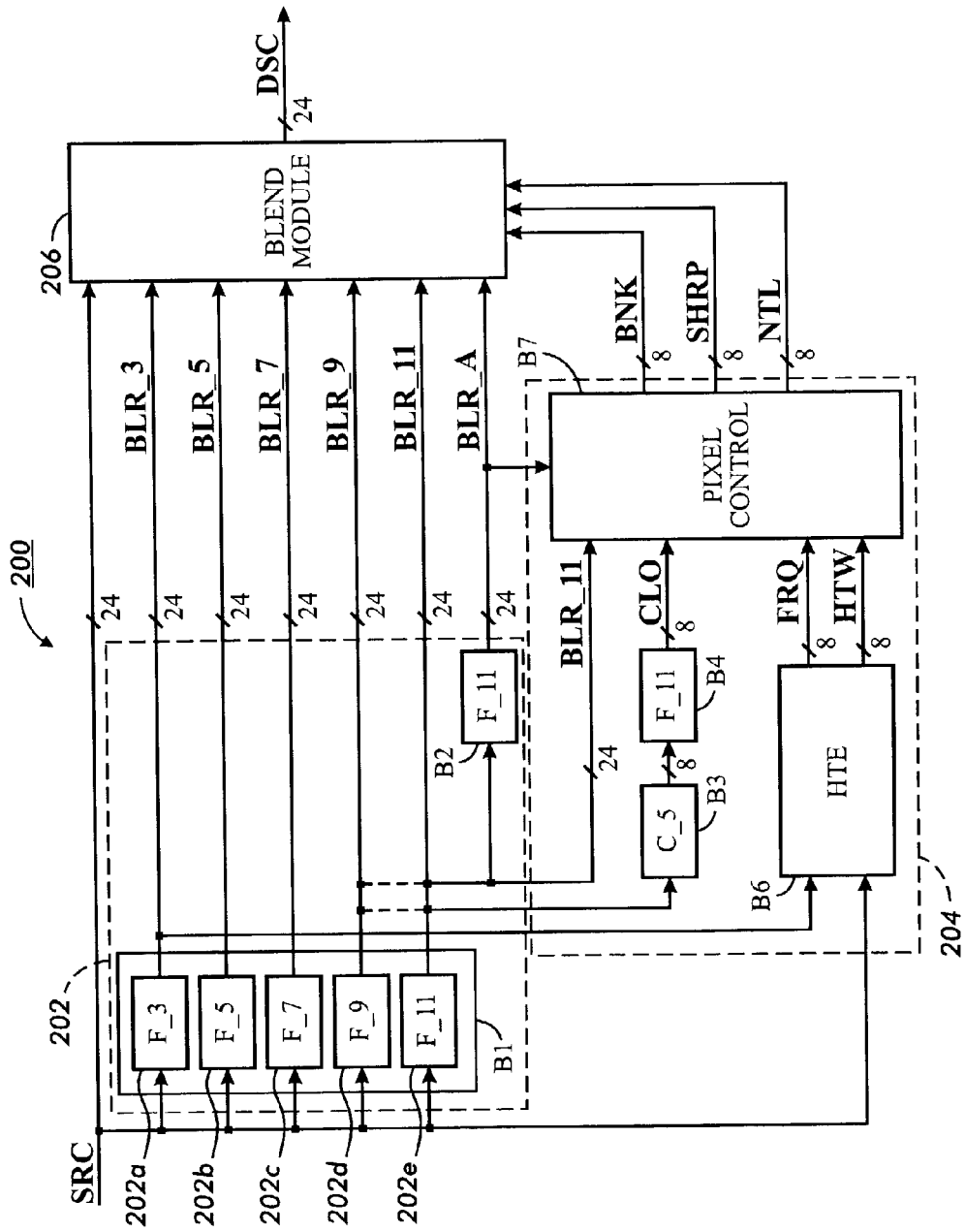
FIG. 2 shows one embodiment of the system of the present invention.

FIG. 2 shows one embodiment 200 of the system of the present invention. System 200 comprises a filter bank module 202, a control module 204 and a blend module 206.

Filter bank module 202 comprises five parallel filters and a sixth filter connected in series with the largest (in terms of filter span) of the five filters. An option is provided to connect the sixth filter in series with the second largest of the five filters instead of the largest filter (as shown with the dotted line in FIG. 2), to reduce the amount of filtering.

The filter bank module 202 comprises a filter array B1 and a filter B2 cascaded in series with one of the filters in the filter array B1 that has a large filter span (e.g., filter 202*d* or 202*e*). The filter array B1 comprises filters 202*a*, 202*b*, 202*c*, 202*d*, 202*e*. The filter bank module 202 requires the most computations in the de-screener system 200.

The purpose of the de-screener system is to detect incoming halftones in the input stream and selectively filter them out. The main objective is to filter out the halftones yet maintain the sharp edges of objects in line art on the page represented by the input image. At the same time, the de-screener system can optionally enhance text or line art objects with sharp edge definitions in order to not significantly compromise the quality of text and line art graphics. The two operations (filtering and enhancement) are tightly but independently controlled.

The first step of the de-screening method is to provide a set of blurred (i.e., lowpass) versions of the original signal. The de-screening (removing halftones) operation is achieved by selectively blending the filtered outputs on a pixel by pixel basis. A control logic is used for determining which outputs are to be blended and by how much, thereby providing a variable blending capability (or an equivalent "instantaneous frequency control") from one pixel to the next.

Although typically no more than two of the filter output signals are blended at any given time, it would not be easy to generate these outputs on demand, that is, when actually needed. The reason is that each subsequent pixel may require blending of a different pair of filter output signals, which may take long time to generate due to the associated large context filtering. Furthermore, some of the filter output signals (such as those of the filters 202*a*, 202*e*, or possibly 202*d*, in FIG. 2) are also needed at all times for the de-screener analysis as part of the detection and control logic in the control module 204. Therefore, for efficiency reasons, all of the filter output signals are concurrently generated by one consolidated module, the filter bank module 202. The specific filter shape chosen (triangular and separable in 2D) enables to implement one filter from the preceding (one size smaller) filter, thereby significantly reducing the number of computations.

The filter array B1 includes five concurrent and independent full-color triangular filters: 202*a*, 202*b*, 202*c*, 202*d*, 202*e* which are 3×3, 5×5, 7×7, 9×9, 11×11 filters, respectively (denoted as F_3, F_5, F_7, F_9 and F_11, respectively, with the index denoting the size of the corresponding filter). The filter array B1 arrangement is as shown in FIG. 2. The filters in the filter array B1 are lowpass filters having different cutoff frequencies to facilitate reduction of different halftone screen frequencies occurring within a predetermined range. The size of the largest filter in the filter array is determined by the lowest halftone frequency that is to be removed. Since the current design is targeted to address up to 600 dpi scanning, it is not possible to significantly reduce the size of the largest filter much beyond its current dimensions.

The input signal to each of the filters is the full-color (L, a, b) source signal SRC. In one embodiment, the chroma channels (a, b) of the source signal SRC could be subsampled by a factor of two in the fast scan direction only. The 24-bit input signal SRC is fed to all the five filters in the filter array B1. The filters are all operating at the full input data rate, each producing an independent full-color filtered output, labeled BLR_n, with n being the filter span.

Figure 3:
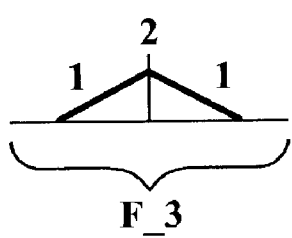
FIG. 3 illustrates the one-dimensional filter responses of various filters in the filter bank in one embodiment.
Figure 3:
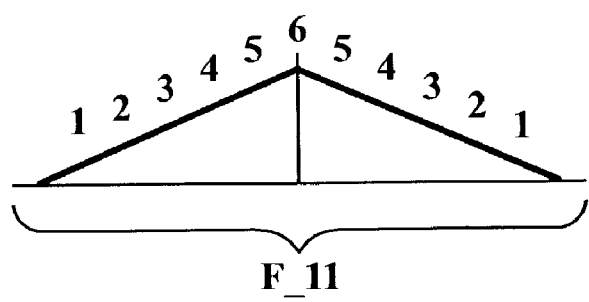
Figure 3:
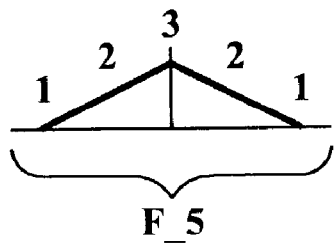
Figure 3:
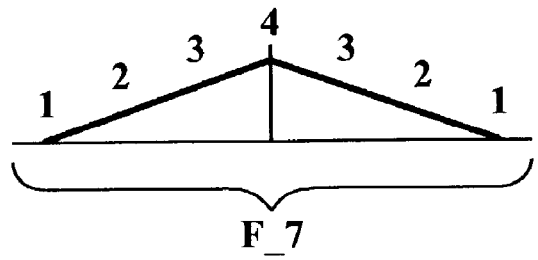
Figure 3:

Each filter processes the input data independently for each of the (L, a, b) color components. Each filter is a two-dimensional filter separable into two constituent one-dimensional filters. In one embodiment, each of the constituent one-dimensional (1D) filters having a symmetric, triangular shape, with integer coefficients. Examples of the 1D discrete responses of the filters are shown in FIG. 3.

Each filter output is normalized back to an 8-bit range. Some filters, such as the filter 202*a* (an F_3 filter), have a total sum of weights that is a power of 2 numbers. These filters will require no division in the normalization step as it can simply be implemented as an arithmetic shift. For example, the F_3 filter has a total weight of 1+2+1=4, and a division by this weight could be accomplished with a simple arithmetic shift right by 2.

When the total weight of a filter does not add up to a power of 2, the compute-intensive division operation could still be avoided by approximating the division using a multiplication by ratio of two numbers, where the denominator is a chosen power-of-2 number.

As an example, the overall 2-D response of the smallest filter, F_3, is:

$$F\_3 = \frac{1}{16}\begin{bmatrix}1\\2\\1\end{bmatrix} * [1\ 2\ 1] = \frac{1}{16}\begin{bmatrix}1 & 2 & 1\\2 & 4 & 2\\1 & 2 & 1\end{bmatrix}. \quad (1)$$

The larger filters can be similarly described. Since these filters are separable, it is best to implement them in two one-dimensional steps that are orthogonal to each other. For a more efficient implementation, larger filters can share partial results with the smaller filters rather than computing the results separately for each of the filters.

One approach to increase the filter efficiency is to increase the vertical context and process many lines sequentially. For example, the largest filter F_11 requires 11 lines of input to produce a single line of output (an efficiency of ~9%). In addition, as the filtering operation progresses down the page to the next line, 10 lines must be re-read while the new line is fetched. The filter efficiency is improved by simultaneously processing more input lines together. For example, if the number of input lines is increased from 11 to 20, the filter could now generate 8 lines of output, and the efficiency goes up to 40%=8/20. However, larger input buffers to store more input lines would imply a larger pipeline delay. In practice, a comfortable trade-off can be found between the filter efficiency and data bandwidth versus the buffering memory size, depending on the desired system cost.

The filter B2 is used to further filter the output of the largest filter 202e (an F_11 filter) in the filter array B1. The output signal BLR_A of filter B2 is used as a reference signal in several places of the de-screener analysis and detection circuitry. For this reason, it must be a signal that is stable and as much noise-free as possible.

The filter B2 contains an identical F_11 filter as the largest filter implemented in the filter array B1, as described previously. By cascading filter B2 with filter 202e, the overall filtering effect is equivalent to filtering with a 22×22 filter.

As will be discussed later (FIG. 8), the signal BLR_A will not be used in the Blend module for blending but only for sharpening the dots.

The de-screener frequency range can be adjusted by changing the filter sizes or the number of filters in the filter array B1, as necessary.

The control module 204 comprises a low-resolution contrast module B3, a filter B4, a halftone estimate module B6 and a pixel control module B7.

The low-frequency contrast module B3 measures the amount of contrast of the most filtered output of the filter array B1. It receives as input the full-color filtered signal from the largest filter 202e (an F_11 filter). The input signal is 24-bit (L, a, b) signal, where (a, b) could be sub-sampled by a factor of 2 in the fast scan direction. The contrast module B3 produces a monochrome output (single channel) which is normalized to fit the output 8-bit range. The contrast module B3 utilizes three 5×5 windows, one per color component, centered on the current pixel of interest.

The operation of the contrast module B3 is as follows. For each pixel location, the content of the 5×5 windows is searched for the minimum and maximum values. The search is done independently for each color component.

The combined contrast measure is defined as the sum of squared contributions from each color component, that is:

$$\Delta L = L_{max} - L_{min}; \quad (2)$$

$$\Delta a = a_{max} - a_{min}; \quad (3)$$

$$\Delta b = b_{max} - b_{min}; \quad (4)$$

where $(L_{max}, L_{min})$, $(a_{max}, a_{min})$, and $(b_{max}, b_{min})$ are the independent minimum and maximum values found within the 5×5 window of the respective color component, and the output value is defined to be:

$$\Delta = (\Delta L^2 + \Delta a^2 + \Delta b^2)/C; \quad (5)$$

where C is a normalization constant to scale back the output to fit an 8-bit range. The value of C is a power-of-two number that is to remain a design parameter. By specifying the value of C as a power-of-two number, the required division operation could be implemented as a simple arithmetic shift to the right. An additional logic is used to limit the value of the result to the range of 8-bit in case the value of $\Delta$ becomes too large.

It is noted that the output contrast value is a sum-of-squares measure, with similar properties to a statistical variance. It measures the largest squared contrast inside the 5×5 windows. It does not matter if there is more than one pixel with the same maximum or minimum values inside the window, the contrast would still be the same. Likewise, if a certain color component is constant over the window, the maximum value would be identical to the minimum, and the contrast contribution would be zero.

In some situations, especially for high-quality scanners that do not emit a lot of noise, it might be sufficient to use a somewhat less filtered version of the input signal to generate the Low-Resolution Contrast output. For these cases, a special option exists to choose the output of the smaller F_9 filter instead of the F_11 filter of the Filter Bank B1. This option is shown as a dotted line in FIG. 2.

The Low-Resolution Contrast Filter B4 is used to apply further filtering on the Low-Resolution Contrast measure outputted from the Low-Resolution Contrast module B3. Since large degree of filtering is necessary for stable signal, a large filter F_11 is used to implement the contrast filter B4.

The contrast filter B4 receives as input the 8-bit output from Low-Resolution Contrast module B3. It produces a filtered and 8-bit normalized output, denoted as the signal CLO. In order to avoid a division as part of the normalization process, it is sufficient to approximate the operation as multiplication of the non-normalized output by a ratio of two large numbers, where the denominator is an integer power-of-two (implemented as a simple arithmetic shift).

Note that, in this embodiment, the contrast filter B4 is otherwise identical to the F_11 filters used in the filter array B1 and filter B2, except it only operates on a single 8-bit color component (as opposed to the full-color filters in B1 and B2).

The Halftone Estimator module is used for measuring the frequency and halftone weight in a small area surrounding the current pixel of interest. The inputs to the Halftone Estimator module are the source signal SRC and the smallest filter output BLR_3 from the filter array B1. Both of these inputs are full-color (L, a, b) signals.

The Halftone Estimator module produces two monochrome (single-channel) output signals, FRQ and HTW, representing the estimated frequency and halftone weight, respectively. Each of these signals is represented by an 8-bit representation. HTW represents the level of confidence in the area being a halftone. If HTW is small (low confidence), active segmentation is turned off to prevent lifting of each and every halftone dot.

Figure 4:
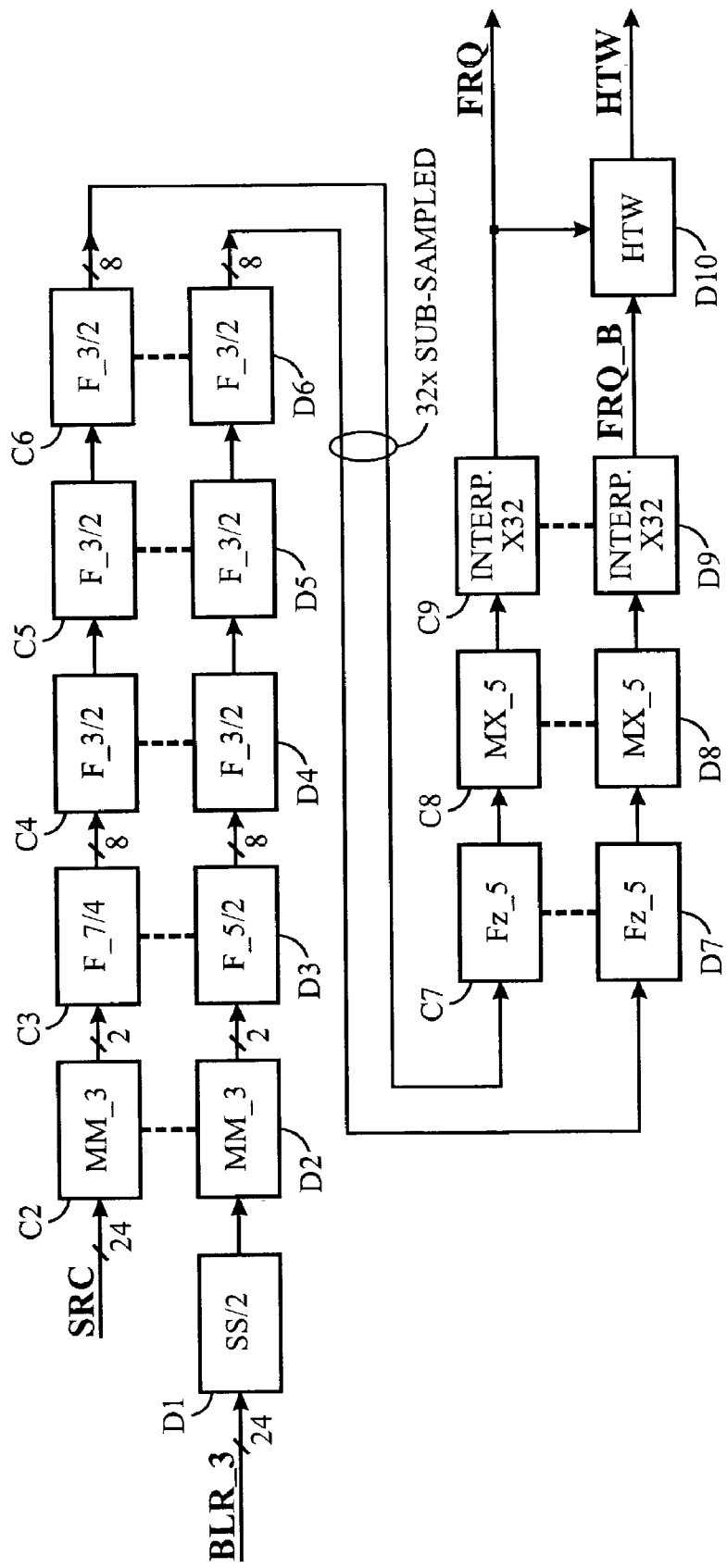
FIG. 4 shows an exemplary structure of the halftone estimate module included in the control module in one embodiment.

FIG. 4 is a block diagram of an embodiment of the Halftone Estimator module B6.

As shown in FIG. 4, the embodiment of the Halftone Estimator module comprises two separate frequency detection channels operating concurrently, the outputs of which are combined together at the very last step to generate the halftone weight. Each frequency channel comprises a Min-Max texture detector, followed by cascaded averaging filters. Most of the averaging filters also sub-sample the data by a factor of 2 at the same time (that is, only produce every other filtered value), so that the peak bandwidth is greatly reduced. Only at the very end the data is up-sampled back to the original resolution.

The notation in FIG. 4 is intended to emphasize the similarity between the two frequency channels by drawing the various blocks as matching pairs connected by the dotted lines (there is no actual connection).

Matching pairs of blocks are given the same block number, with the initial letter C for the original frequency channel and D for the blurred frequency channel. Matching pairs are therefore designated as (Cn, Dn), with n=[2, ..., 9].

The notation used for the various block names is as following: the first number (underscored) denotes the size of the window used; the second number following the slash denotes the amount of sub-sampling that is done inside the block in each direction. Thus, for example, a filter designated B_3/2 indicates a blurring filter (i.e., a lowpass filter) B with 3×3 window size, whose output is sub-sampled by a factor of 2 in both directions (that is, only one output is sent for every 2×2=4 input pixels).

The following provides a more detailed description of the various blocks included in the Halftone Estimate module.

The Sub-Sampling unit D1 is reducing the data rate by a factor of 4 by omitting every other pixel and line of the input. The sub-sampling is only needed in the blurred frequency channel D. No sub-sampling is needed for the full-resolution frequency channel C. The input to the unit D1 is the full-color (L, a, b) output signal BLR_3 from the smallest filter in the filter array B1. The output of the unit D1 is a full-color (L, a, b) signal. Since the input signal to unit D1 has been filtered, sub-sampling will not cause aliasing artifacts.

The two identical Min-Max Detection modules C2, D2 are used for finding peaks and valleys in the input signal. By counting the number of peaks and valleys per unit area, a measure of the local frequency is obtained.

Each of the two Min-Max Detection units is taking as input a full-color (L, a, b) signal. Each unit utilizes three 3×3 windows to indicate when the center pixel of one of the color components is at an extreme value (either peak or valley) relative to its 8 neighbors, in accordance with the logic described below.

Each color component is independently examined in its own 3×3 window. The output from each Min-Max Detection unit is a 2-bit signal indicating the total number of color components that are in an extreme value state. This number could vary from zero (no color component was at an extremum) to 3 (all color components are at an extremum). When one or two color components are at an extremum, no distinction is made as to which ones are at an extremum; only the total number of components at an extremum is outputted.

Figure 5:
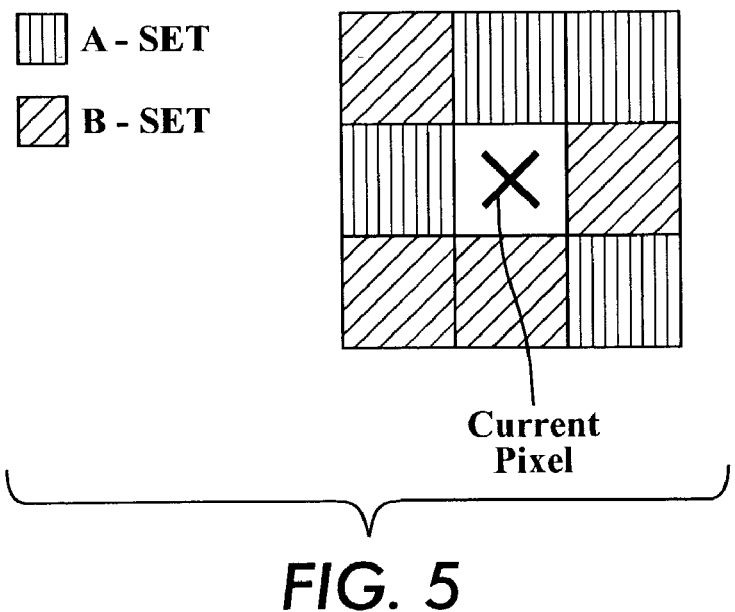
FIG. 5 shows a min-max detection scheme used by the min-max detection modules included in the halftone estimate module of FIG. 4.

FIG. 5 shows the Min-Max Detection structure. For each color component, the outer ring of 8 pixels surrounding the center pixel (the current pixel of interest) is first analyzed. The 8 outer pixels are further divided into two sets of 4 pixels each as shown in FIG. 5. The partitioning of the outer ring into two sets is useful for reducing the likelihood of false alarms in detecting straight-line segments as halftones (since most commonly encountered halftones are typically classified as clustered dots or line-screens).

The novel feature of this structure pattern is that the two distinct sets of pixels are arranged such that, for any line segment crossing the structure pattern, each of the two sets of pixels does not lie entirely on one side of the line segment.

For each set, the pixel values are compared among the members of the set to determine the minimum and maximum values within each set independently:

$A_{max}$=max $(Aij)$; over all $(i, j)$ belonging to the set $A$; (6)

$A_{min}$=min $(Aij)$; over all $(i, j)$ belonging to the set $A$; (7)

$B_{max}$=max $(Bij)$; over all $(i, j)$ belonging to the set $B$; (8)

$B_{min}$=min $(Bij)$; over all $(i, j)$ belonging to the set $B$; (9)

Then the overall outer ring contrast is computed from the above values:

$\Delta_{ring}$=max $(A_{max}, B_{max})$-min $(A_{min}, B_{min})$; (10)

The value of $\Delta_{ring}$ is next tested to see if there is any contrast for the outer ring. Regardless of the center pixel value, the output is set to zero (not an extremum point) if the value of $\Delta_{ring}$ is less than or equal to a pre-defined small threshold T2:

If $(\Delta_{ring} \leq T2)$, return (0); (11)

If, on the other hand, there is sufficient activity in the outer ring (as indicated by outer ring contrast>T2), then two tests are made to see if the center pixel value is at an extreme value relative to the outer ring values. The center pixel value X is defined to be at a peak if it is (significantly) larger than the maximum pixel value of either set:

If $[(A_{max}+S<X)$ AND $(B_{max} \leq X)]$, return (1); (12)

where S is the outer ring contrast, scaled by a contrast scaling parameter C:

$S=\Delta_{ring}/C$; (13)

In one embodiment, the contrast scaling parameter C is set to equal to 8. The actual value of the scaling parameter C is a function of the signal noise level at the input. It is desirable to maintain the value of C as a generic parameter of the Min-Max Detection units. The value of C can be limited to a power-of-two number so that it could be implemented as an arithmetic shift to save the need to perform a division operation per pixel.

Similarly, the center pixel value X is defined to be at a valley if it is (significantly) smaller than the minimum pixel value from either set A or B:

If $[(A_{min}>X+S)$ AND $(B_{min} \geq X)]$, return (1); (14)

Equations (12) and (14) determine the two conditions where the output from the 3×3 detection window are set to 1; in all other cases the output will be set to 0.

In a second embodiment, the center pixel value X is defined to be at a peak if it is (significantly) larger than the maximum pixel value of either set:

If $[(A_{max}+N_{TH}<X)$ AND $(B_{max} \leq X)]$, return (1); (12A)

where $N_{TH}$ is the noise threshold defined as:

$N_{TH}$=NoiseBias+(NoiseFactor×X)/256 where the NoiseBias and the NoiseFactor are tuning parameters.

Similarly, the center pixel value X is defined to be at a valley if it is (significantly) smaller than the minimum pixel value from either set A or B:

If $[(A_{min}>X+N_{TH})$ AND $(B_{min} \geq X)]$, return (1); (14A)

Equations (12A) and (14A) determine the two conditions where the output from the 3×3 detection window are set to 1; in all other cases the output will be set to 0. Note that in this second embodiment, there is no need to compute the overall outer ring contrast.

Finally, as mentioned above, each color component is processed independently through its own separate 3×3 window. The three binary outputs of the color components are then added together to form the final 2-bit output of the Min-Max Detection module.

The two Min-Max Detection outputs C2 and D2 are fed to the Cascaded Filter Chain C3–C6 and D3–D6, respectively. The first filtering units, C3 and D3 are different between the two chains, but other than that, the subsequent units C4–C6 and D4–D6 are all identical. In one embodiment, all the filtering units are symmetric, triangular, and separable filters similar in shape to those shown in FIG. 3.

The first filter unit C3 receives the 2-bit output from the high-resolution Min-Max detection unit C2. The input is filtered through the F_7/4 filter, which, in one embodiment, is a 7×7 symmetric, triangular, and separable filter as discussed previously. The shape of the filter is similar to the shape of the filter F_7 shown in FIG. 3.

The filter F_7/4 differs from the filter F_7 in that the output is sub-sampled by a factor of 4 in both direction as indicated by the /4 notation. This means that the filter F_7/4 is only producing one output pixel for every fourth input pixel and every fourth line, thereby effectively reducing the data bandwidth by a factor of 16.

The other difference from the filters in the filter bank is that a different normalization factor is used. Since the input to the first filtering unit C3 is limited to 2-bits (rather than 8-bit input as in the filter bank), the output of the filter is normalized by scaling the result by a different power of two number (e.g., 2). The scaling power should remain a design parameter. After the first normalization, however, the result has been scaled to fit the range of 8-bits, so that subsequent filtering is utilizing the 8-bit representation system from this point forward.

The second chain leading-filter unit D3 is different than C3 in two-aspects. First, the F_5/2 filter is only sub-sampling the input by a factor of 2 (rather than 4) in each direction. This means that the filter is only producing one output pixel for every other input pixel and every other line, thereby effectively reducing the data bandwidth by a factor of 4. Since the sub-sampling factor is smaller, the span of the filter can consequently be reduced from 7 (for C3) to 5 (for D3). In one embodiment, the normalization factor for the F_5/2 filter was determined to be $2^9$. Note that the (8-bit wide now) outputs from the two leading filter units C3 and D3 are both at the same resolution—sub-sampled by 4 in both dimension, or 1/16 th of the original input bandwidth. This is because the F_7/4 filter of the C3 unit in the upper chain is sub-sampling the data by 4, while the combination of the SS/2 and F_5/2 unit D3 in the lower chain results in an overall output rate that matches the output rate of C3.

The two outputs from the filtering units C3 and D3 are further filtered through the three additional and identical units C4–C6 and D4–D6 respectively. Each of the six filtering units filters its respective input signal with an F_3/2 filter (with coefficients 1-2-1) which also sub-samples the data by a factor of 2 in both directions. Note that each of these filters has a total weight of 1+2+1=4, thus the implementation can be simplified by replacing the normalization division with a simple arithmetic shift right by 2.

Since each of the filtering units is also sub-sampling its respective input signal by a factor of 2, the signals at the respective outputs of the C6 and D6 filter units are in effect sub-sampled by a factor of 32 in each direction (or 1024 times reduced in bandwidth).

The next two filter units C7 and D7 are special filter units, denoted as a Fz_5 filter. The z suffix indicates a filter that eliminates any zero terms from the total normalization weight. The general Fz_n filter equation is as following:

$$\text{output value} = \frac{\sum a_{ij} * w_{ij}}{\sum w_{ij} * \delta(a_{ij})}; \quad (15)$$

where $a_{ij}$ are the 2D input values, $w_{ij}$ are the 2D filter coefficients, and $\delta(a_{ij})$ is the function defined as:

$$\delta(a_{ij})=1 \text{ if } a_{ij}\neq 0; \text{ otherwise } \delta(a_{ij})=0; \quad (16)$$

As can be seen from equation (15), the difference from a regular filter is in that the total weight is no longer just a known normalization constant. Since the number of incoming pixels having the value of zero is not known in advance, an ongoing accumulator for the weight must be kept. At the same time the filter loop is operating, the content of the accumulator is increased by the value of the current filter coefficient if the corresponding input value is non zero.

Since the total weight is not fixed and known in advance, the final normalization of the filter output is dependent on the value of the total weight. However, it is still possible to avoid the division operation in equation (15) by using a predetermined multiplication table with multiple choices for the possible total weight values.

The purpose of using the special Fz_5 filters is to obtain reliable frequency and halftone weight estimates even when the filter gets very close to the edge of a halftone area.

The two MX_5 modules C8 and D8 search for the maximum value in a 5×5 window and output the maximum value.

Each of the two Interpolation modules C9 and D9 interpolates (i.e., up-samples) the signal back by a factor of 32 to restore it to the original resolution. Each interpolation unit is performing bilinear interpolation, essentially generating 32*32 pixels for each 4 original pixels. The step size for the bilinear interpolation is 1/32nd of the original pixel grid.

The Halftone Weight module D10 takes as input the outputs of the two interpolation units denoted as FRQ and FRQ_B. The Halftone Weight module D10 adds together the contribution from each of the input as following:

$$HTW=HTW_H+HTW_L; \quad (17)$$

where $$HTW_H=(FRQ-T_H)*SF_H \text{ if } FRQ>T_H; 0 \text{ otherwise}; \quad (18)$$

$$HTW_L=(FRQ\_B-T_L) * SF_L \text{ if } FRQ\_B>T_L; 0 \text{ otherwise}; \quad (19)$$

where $T_H$ and $T_L$ are two predetermined thresholds, and $SF_H$ and $SF_L$ are two predetermined scale factors for the original (high) and filtered (low) frequencies FRQ and FRQ_B respectively.

An additional logic ensures that the value of HTW is limited to never exceed the allowed 8-bit range of [0 . . . 255].

Figure 6:
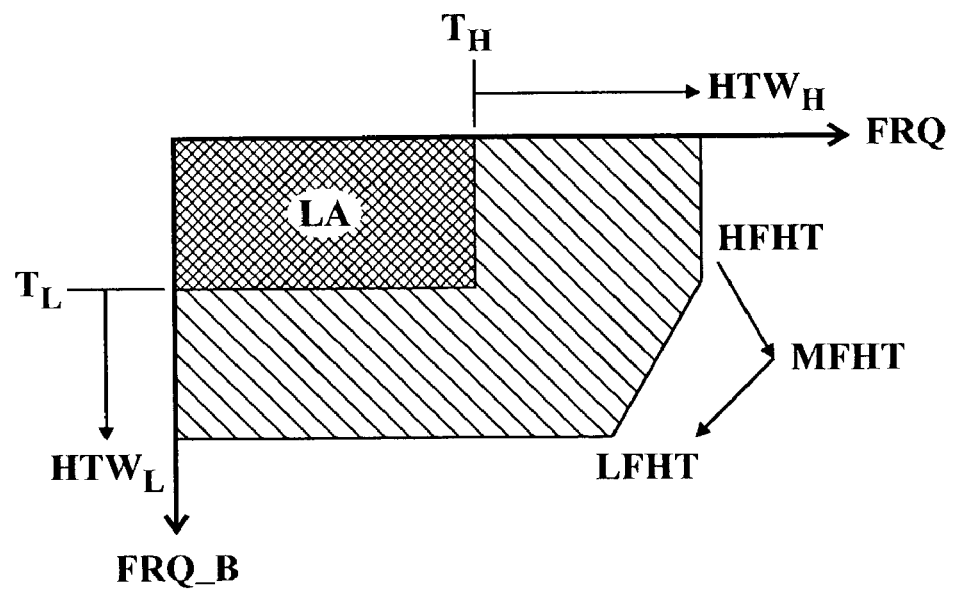
FIG. 6 illustrates the equation implemented the halftone weight module included in the halftone estimate module.

FIG. 6 is a diagram illustrating the equations (17), (18), (19) and the clipping effect of the additional logic which limits the value of HTW to the allowed range. The region denoted as "LA" represents the line-art region. As illustrated in FIG. 6, one particular color screen pattern can change from the location indicated as HFHT to MFHT to LFHT as its frequency is changed from high to medium to low. Since the curve illustrated by the loci on the 2D plot is convex, it is not possible to distinguish the screen frequency by observing either FRQ or FRQ_B alone.

Referring to FIG. 2, the Pixel Control module B7 receives as inputs the super blur signal BLR_A from filter B2, the contrast value CLO from filter B4, and the frequency FRQ and halftone weight HTW values from the Halftone Estimate module B6. The CLO, FRQ, and HTW are all 8-bit numbers, and only the super blur signal BLR_A is a full-color (L, a, b) signal.

The Pixel Control module B7 produces an instantaneous decision, on a pixel by pixel basis, regarding which pair of filtered outputs of the filter array B1 is to be blended by the blend module 206, and the blending proportion. This decision is communicated to the blend module 206 for execution via the control signal BNK. In one embodiment, the BNK output is an 8-bit signal whose three most significant bits indicate which one of the filter bank 202 outputs is selected for the blending, and whose remaining five least significant bits indicate the blending proportion to apply to this selected filter output and a consecutive (one size filter larger) one. The number of significant fraction bits is chosen based on the desired blending accuracy. The actual blending operation is implemented inside the Blend module 206 using full-color linear interpolation.

In addition, the Pixel Control module B7 also generates additional enhancement control in terms of the pixel neutrality (represented by signal NTL) and the edge sharpness (represented by signal SHRP). The 8-bit signals NTL and SHRP are also communicated to and executed in the Blend module 206.

Figure 7:
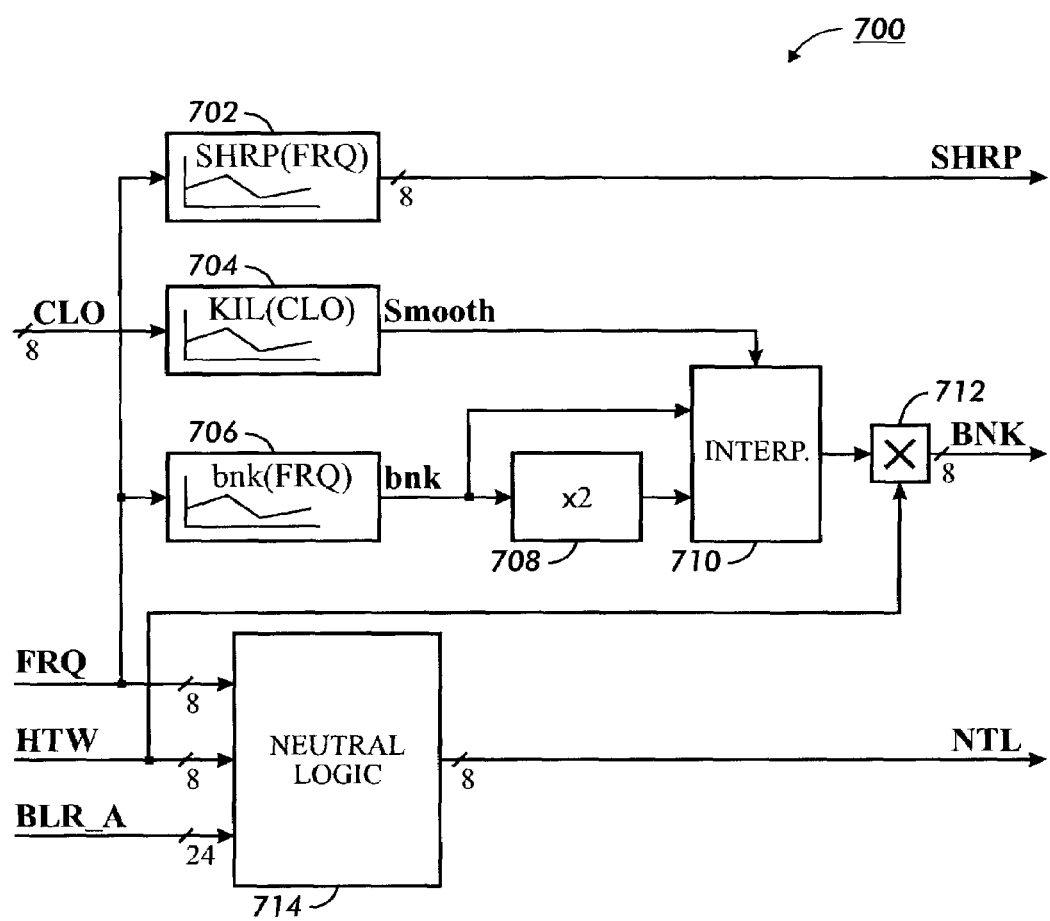
FIG. 7 is a block diagram of the pixel control module included in the control module as implemented in one embodiment.

FIG. 7 is a block diagram of the Pixel Control module B7 included in the control module as implemented in one embodiment.

The Pixel Control module B7 utilizes three programmable piecewise linear functions to control its operation. These functions include the SHRP(FRQ), KIL(CLO), and BNK (FRQ). In general, the piecewise linear function map 8-bits of input to 8-bits of output, and could be implemented using a full 256-entry lookup table. However, since the shape of these functions is rather smooth, these functions could equivalently be approximated using a small number of piecewise linear segments. In one embodiment, these functions are implemented as piecewise linear segments and their content (for experimental purposes and for tuning the system to a particular scanner device) can be adjusted by moving the endpoints around. In another implementation, for simplicity, the functions are implemented using a generic lookup table.

As can be seen from FIG. 7, the 8-bit output signal SHRP is generated by passing the 8-bit input signal FRQ through the piecewise linear function block 702. The FRQ signal is also used as an input to the piecewise linear function block 706 to generate the preliminary 8-bit signal bnk. The 8-bit CLO input is mapped to the 8-bit signal Smooth by the piecewise linear function block 704.

The intermediate bnk signal is multiplied by a factor of 2 by the multiplying unit 708. A linear interpolation unit is then used to blend the doubled bnk output from unit 708 with the original signal bnk. The amount of blending is determined by the control signal Smooth produced by the piecewise linear function block 704. The purpose of units 708 and 710 is to decrease the filter size (indicated by bnk value) when the contrast is high, and increase the filter size up to double when the contrast is low (smooth). The 8-bit blended output is then multiplied with the 8-bit input signal HTW in the multiplying unit 712, and the resulting signal is normalized to fit within the 8-bit range to form the output BNK. As indicated in FIG. 6, a low HTW implies a line art area. On the other hand, a high HTW value indicates that halftones are likely.

The Neutral logic block 714 receives the super blur signal BLR_A and the halftone weight signal HTW. The function of the Neutral logic block 714 in FIG. 7 is as follows. First, the chroma-squared values of the super blur signal BLR_A are added together to form the signal CSQ:

$$CSQ = (a_{BLR\_A})^2 + (b_{BLR\_A})^2; \qquad (20)$$

The CSQ signal is first compared with the threshold $T_{CSQ}$ to determine if it has large chroma components:

$$\text{If } (CSQ > T_{CSQ}) \text{ then } NTL = 0; \qquad (21)$$

If $(CSQ \leq T_{CSQ})$ then the signal has low chroma and the subsequent test is performed:

$$\text{If } [(CSQ * SF_{CSQ} + HTW) < T_{NTL}] \text{ then } NTL = 1; \text{ else } NTL = 0; \qquad (22)$$

where $SF_{CSQ}$ is a predefined scale factor and $T_{NTL}$ is a predefined constant parameter. The rationale behind equation (22) is that the neutrality of a given pixel is also affected by the halftone weight HTW. For small HTW values (low strength over the thresholds $T_H$ and $T_L$ in FIG. 6), a larger amount of chroma-squared CSQ could be tolerated before the current pixel is to be declared non-neutral and vice versa.

Referring to FIG. 2, in one embodiment, the Blend module 206 selects two consecutive filter outputs from the filter array B1 and proportionally blends the two to create the de-screened output, in accordance with the control signal BNK received from the Pixel Control module B7.

As discussed previously, the format of the 8-bit BNK signal is such that, in one embodiment, the three most significant bits of the 8-bit BNK signal select the correct filter output, and the remaining 5 least significant bits are used to determine the amount of blending to be applied to this selected filter output and the consecutive (one size larger) filter output.

Figure 8:
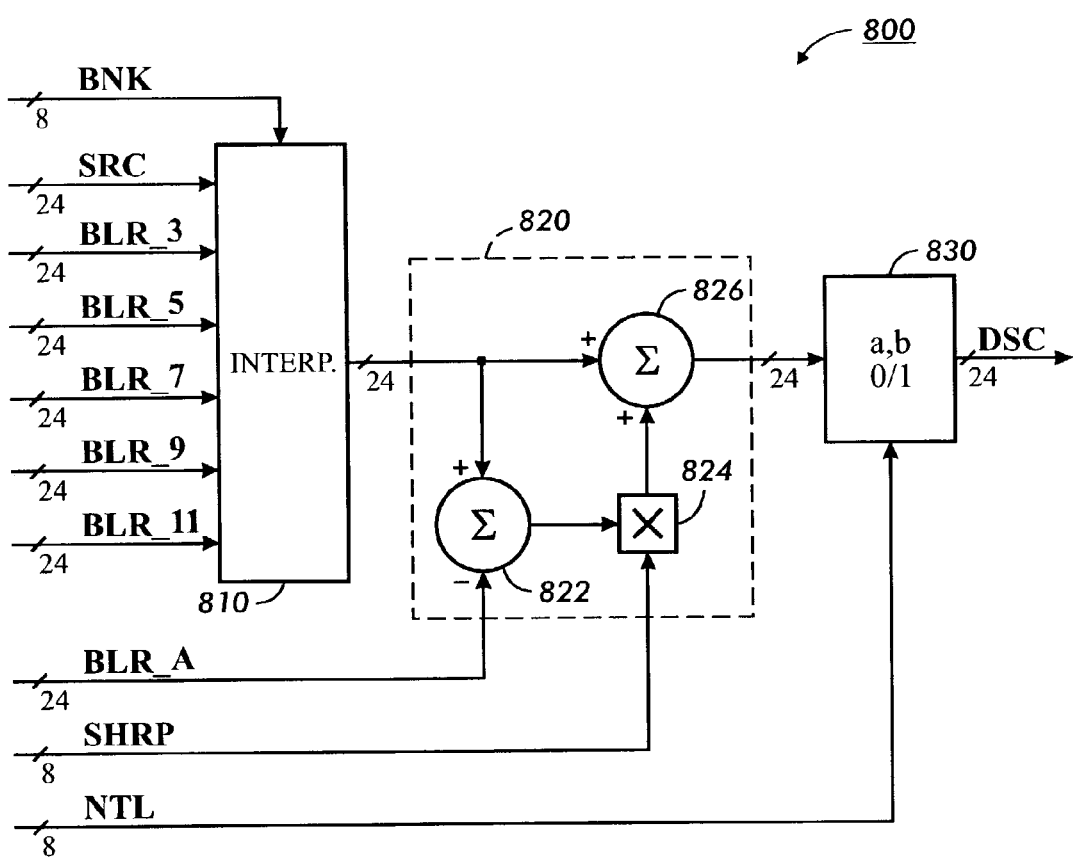
FIG. 8 is a block diagram of the blend module as implemented in one embodiment.

FIG. 8 is a block diagram of the blend module as implemented in one embodiment 800. Embodiment 800 comprises a full-color linear interpolation unit 810 to blend together the two selected filter bank outputs, an Unsharp Mask filter 820 to further enhance the blended output by sharpening the image, and a chroma control unit 830 to control the neutrality of the de-screened output signal.

The linear interpolation unit 810 receives as inputs the five full-color outputs from the filter array B1, that is, BLR_3 through BLR_11, as well as the original full-color source input SRC. At any given time, only two of these inputs are used for blending, but the specific pair used can be instantaneously switched based on the BNK input from the Pixel Control module B7. Note that the stack of six inputs allow the blend module 206 to generate a smoothly varying output across the full filtered range, that is, from the unfiltered source SRC to the most lowpass filtered signal of the filter array B1. The blending equation is:

$$\text{output value} = BLR\_n * \alpha + BLR\_(n+1) * (1-\alpha); \qquad (23)$$

where n is the value of three most significant bits of BNK, and $\alpha$ is the blending fraction value as expressed by the remaining five least significant bits of BNK. Note that n=0 is defined to select the source signal SRC as BLR_0. The interpolation is a full-color interpolation over (L, a, b), performed over the three-color components independently.

The blended output from the linear interpolation unit 810 is then passed through the Unsharp Mask filter 820. The Unsharp Mask filter 820 further enhances the blended output by sharpening the image. The amount of sharpening is controlled by the 8-bit SHRP signal sent from the Pixel Control module B7.

The operation of the Unmask Sharp filter 820 is achieved by subtracting a low-frequency version of the source input (for example, the super blur signal BLR_A) from the blended output, via adder 822. The difference is then scaled by some factor determined by the SHRP signal via multiplying unit 824, then added back to the blended output via adder 826.

Since the Unmask Sharp filter 820 subtracts some portion of the low frequency content, the difference (i.e., output of adder 822) contains more of the high-frequency content. By adding more of the high-frequency content (i.e., output of 824) back to the original output, the net result is to enhance the image and sharpen it.

Additionally, the Blend module 800 comprises the chroma control unit 830 which provides the option to control the neutrality of the de-screened output signal by directly controlling the chroma components (a, b). When a pixel is determined to be neutral, the output DSC chroma components can be forced to zero by setting the output chroma values to a=b=128 (chroma value 128 corresponds to the origin). Similarly, if a pixel is determined to be non-neutral, the output DSC chroma components can be forced away from zero by setting the output chroma values to a=b=129 (chroma value 129 corresponds to +1). The control for neutrality is sent from the Pixel Control module B7 via the NTL signal, previously described.

In the description above, elements of an embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, read-only memory (ROM), erasable ROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read-only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the above description of the invention. The term "code" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus or system may include any combination of hardware, software, and firmware modules.

One embodiment of the invention may be described as a method or process which is usually depicted as a flowchart, a flow diagram, a structure diagram, or a block diagram. Although any of these depictions may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for controlling de-screening operation in a de-screening system, the de-screening system including a bank of filters, the bank of filters receiving an image signal and producing a set of filter output signals, the method comprising the operations of:

(1) receiving, via a contrast module, a filter output signal from a first filter in a bank of filters and producing a contrast signal, the first filter being one of the filters having larger filter spans in the bank of filters;

(2) receiving, via a halftone estimate module, the image signal and a second filter output signal from a second filter in the bank of filters, the second filter being one of the filters-having smaller filter spans in the bank of filters, and producing an estimated frequency signal and a halftone weight signal; and (3) receiving, via a pixel control module, the contrast signal from the contrast module and the estimated frequency signal and the halftone weight signal from the halftone estimate module, and producing the first control signal, the first control signal including information regarding which of the filter output signals are to be blended and the proportion of blending.

2. The method of claim 1 wherein operation (2) comprises the operation of processing concurrently the image signal and the second filter output signal via, respectively a first and a second frequency detection modules included in the halftone estimate module.

3. The method of claim 2 wherein operation (2) comprises the operations of:

detecting extrema in each of the image signal and the second filter output signal via a min-max texture detector included in each of the frequency detection modules, and outputting respective detected signals; and filtering the respective detected signals via respective cascades of averaging filters and outputting respective filtered detected signals.

4. The method of claim 3 wherein the operation of detecting extrema is performed by using a structure pattern within a window, the structure pattern having two distinct sets of pixels arranged such that, for any line segment crossing the structure pattern, each of the two sets of pixels does not lie entirely on one side of the line segment.

5. The method of claim 3 wherein operation (2) further comprises the operation of filtering each of the two filtered detected signals via a special filter included in each of the frequency detection modules to ensure reliability of the estimated frequency signal and the halftone weight signal even in the presence of an edge of a halftone area in the image signal.

6. The method of claim 5 wherein operation (2) further comprises the operation of searching for a maximum value within a window in the output of each of the special filters via a module included in each of the frequency detection modules.

7. The method of claim 2 wherein operation (2) further comprises the operations of sub-sampling and interpolating.

8. The method of claim 2 wherein operation (2) comprises the operations of combining the outputs of the first and second frequency detection modules and producing the halftone weight signal, via a halftone weight module included in the halftone estimate module.

9. The method of claim 1 wherein operation (3) comprises the operation of processing the contrast signal, the estimated frequency signal and the halftone weight signal via at least one piecewise linear function block included in the pixel control module to produce the first control signal which includes information regarding which of the filter output signals are to be blended and the proportion of blending.

10. The method of claim 9 wherein operation (3) comprises the operation of processing the estimated frequency signal via a second piecewise linear function block included in the pixel control module to produce a second control signal for controlling sharpness.

11. The method of claim 9 wherein operation (3) comprises the operation of processing the estimated frequency signal, the halftone weight signal and a lowpass filtered version of the image signal, via a neutral logic block included in the pixel control module to produce a third control signal for controlling the neutrality of a current pixel.

12. A control system included in a de-screening system, the de-screening system including a bank of filters, the bank of filters receiving an image signal and producing a set of filter output signals, the control system comprising:

a contrast module receiving a filter output signal from a first filter in a bank of filters, the first filter being one of the filters having larger filter spans in the bank of filters, and producing a contrast signal;

a halftone estimate module receiving the image signal and a filter output signal from a second filter in the bank of filters, the second filter being one of the filters having smaller filter spans in the bank of filters, and producing an estimated frequency signal and a halftone weight signal; and a pixel control module receiving the contrast signal from the contrast module and the estimated frequency signal and the halftone weight signal from the halftone estimate module, and producing the first control signal, the first control signal including information regarding which of the filter output signals are to be blended and the proportion of blending.

13. The control system of claim 12 wherein the halftone estimate module comprises a first and a second frequency detection modules operating concurrently.

14. The control system of claim 13 wherein each of the frequency detection modules comprises a min-max texture detector for detecting extrema in each of the image signal and the second filter output signal and outputting two respective detected signals, and a cascade of averaging filters for filtering the respective detected signal and outputting a respective filtered detected signal.

15. The control system of claim 14 wherein the min-max texture detector uses a structure pattern within a window, the structure pattern having two distinct sets of pixels arranged such that, for any line segment crossing the structure pattern, each of the two sets of pixels does not lie entirely on one side of the line segment.

16. The control system of claim 14 wherein each of the frequency detection modules further comprises a special filter to filter the respective detected signals to ensure reliability of the estimated frequency signal and the halftone weight signal even in the presence of an edge of a halftone area in the image signal.

17. The control system of claim 16 wherein each of the frequency detection modules further comprises a module for searching for a maximum value within a window in the output of the respective special filter.

18. The control system of claim 13 wherein each of the frequency detection modules further comprises at least one sub-sampling unit and at least one interpolation unit.

19. The control system of claim 13 wherein the halftone estimate module further comprises a halftone weight module for combining the outputs of the first and second frequency detection modules and producing the halftone weight signal.

20. The control system of claim 12 wherein the pixel control module comprises at least one piecewise linear function block producing the first control signal which includes information regarding which of the filter output signals are to be blended and the proportion of blending.

21. The control system of claim 20 wherein the pixel control module further comprises a second piecewise linear function block receiving the estimated frequency signal and producing a second control signal for controlling sharpeness.

22. The control system of claim 20 wherein the pixel control module further comprises a neutral logic block receiving as inputs the estimated frequency signal, the halftone weight signal and a lowpass filtered version of the image signal, and producing a third control signal for controlling the neutrality of a current pixel.

23. An article of manufacture comprising:

a machine usable medium having program code embedded therein, the program code is used for controlling de-screening operation in a de-screening system, the de-screening system including a bank of filters, the bank of filters receiving an image signal and producing a set of filter output signals, the program code comprising:

machine readable code to process a filter output signal received from a first filter in a bank of filters and produce a contrast signal, the first filter being one of the filters having larger filter spans in the bank of filters;

machine readable code to process the image signal and a second filter output signal received from a second filter in the bank of filters, the second filter being one of the filters having smaller filter spans in the bank of filters, and produce an estimated frequency signal and a halftone weight signal; and machine readable code to process the contrast signal and the estimated frequency signal and the halftone weight signal, and produce the first control signal, the first control signal including information regarding which of the filter output signals are to be blended and the proportion of blending.

* * * * *